United States Patent

Schwartz et al.

[11] Patent Number: 5,557,998
[45] Date of Patent: Sep. 24, 1996

[54] BAGEL CORING APPARATUS

[76] Inventors: Eli H. Schwartz; Jerilyn H. Schwartz, both of 17056 Huntington Pkwy., Boca Raton, Fla. 33496

[21] Appl. No.: 358,718

[22] Filed: Dec. 19, 1994

[51] Int. Cl.$^6$ .................................................. B26D 3/06
[52] U.S. Cl. .......................... 83/875; 30/300; 83/109; 83/451; 83/932; 99/542; 99/544; 269/13
[58] Field of Search ............... 83/875, 932, 356.3, 83/762, 763, 451, 876, 109; 99/543, 515, 537, 542, 544; 269/13, 14, 900, 909, 54.4, 54.5, 287; 30/176, 301, 302, 303, 347, 352, 353, 356, 300

[56] References Cited

U.S. PATENT DOCUMENTS

| | | | |
|---|---|---|---|
| 243,035 | 6/1881 | Geer | 99/515 |
| 2,156,645 | 5/1939 | Waller . | |
| 2,508,868 | 5/1950 | Ross . | |
| 2,715,927 | 8/1955 | Cupper et al. | 99/537 |
| 2,753,903 | 7/1956 | Allison | 269/14 |
| 2,918,099 | 12/1959 | Goldstein | 269/54.4 |
| 3,504,720 | 4/1970 | Mason | 146/6 |
| 3,821,061 | 6/1974 | Schier | 269/54.5 |
| 3,937,850 | 2/1976 | Farha et al. | 426/484 |
| 3,952,621 | 4/1976 | Chambos | 83/733 |
| 4,412,483 | 11/1983 | Hoegh | 99/537 |
| 4,441,410 | 4/1984 | Thompson | 99/538 |
| 4,760,766 | 8/1988 | Short | 83/356.3 |
| 4,979,419 | 12/1990 | Sonkin | 83/875 |
| 5,033,193 | 7/1991 | Valenti | 30/124 |

FOREIGN PATENT DOCUMENTS 2419100   11/1975   Germany ..................... 83/356.3

*Primary Examiner*—Eugenia Jones
*Assistant Examiner*—Charles Goodman
*Attorney, Agent, or Firm*—Oltman Flynn & Kubler

[57] ABSTRACT

A coring apparatus for coring a substantially annular food item includes a base member, a post member extending from the base member, the post member including a drive shaft guide structure, a drive shaft having a longitudinal axis and being rotatably fitted through the guide structure, the drive shaft having shaft external threads, a mechanism for engaging the shaft external threads, so that rotating the drive shaft relative to the post member causes the drive shaft to advance along the longitudinal axis relative to the post member, a food item cutting element mounted on the drive shaft including arched blades having blade cutting edges radially spaced from the drive shaft longitudinal axis for cutting along a circular path, and a food item holding structure connected to the mounting base and located within the longitudinal axis of the drive shaft and adjacent to the cutting element for securing the food item against rotation relative to the post member so that the cutting element is advanced toward the holding structure and into contact with the food item by rotating the drive shaft in one direction.

14 Claims, 3 Drawing Sheets

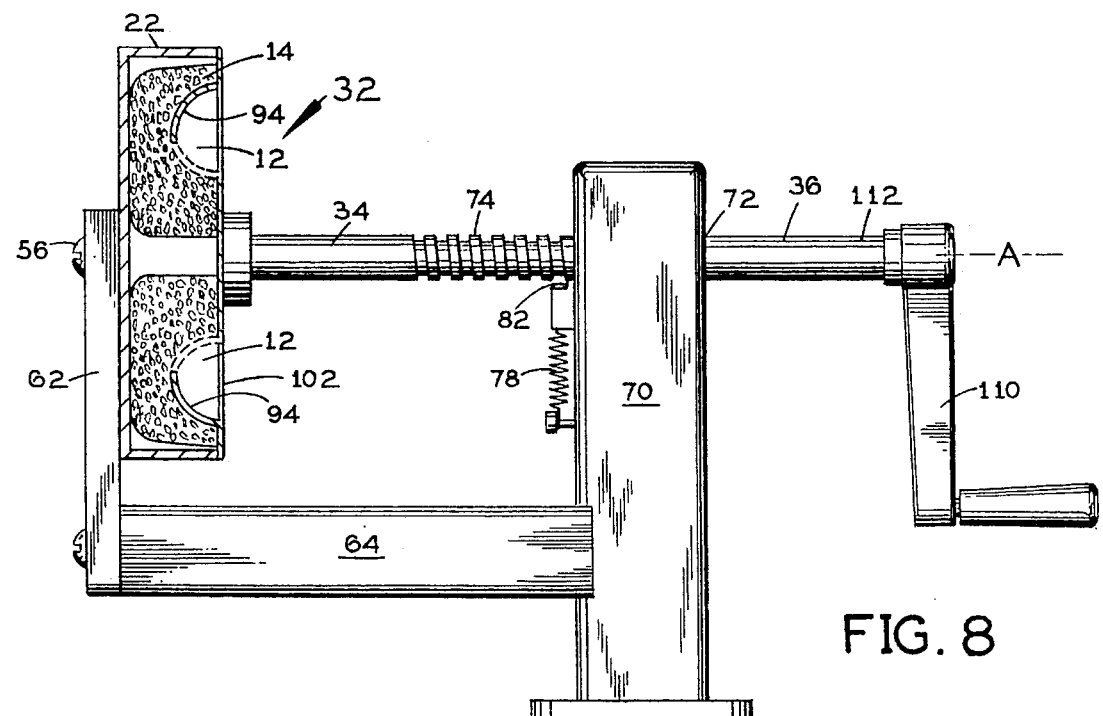
FIG. 8
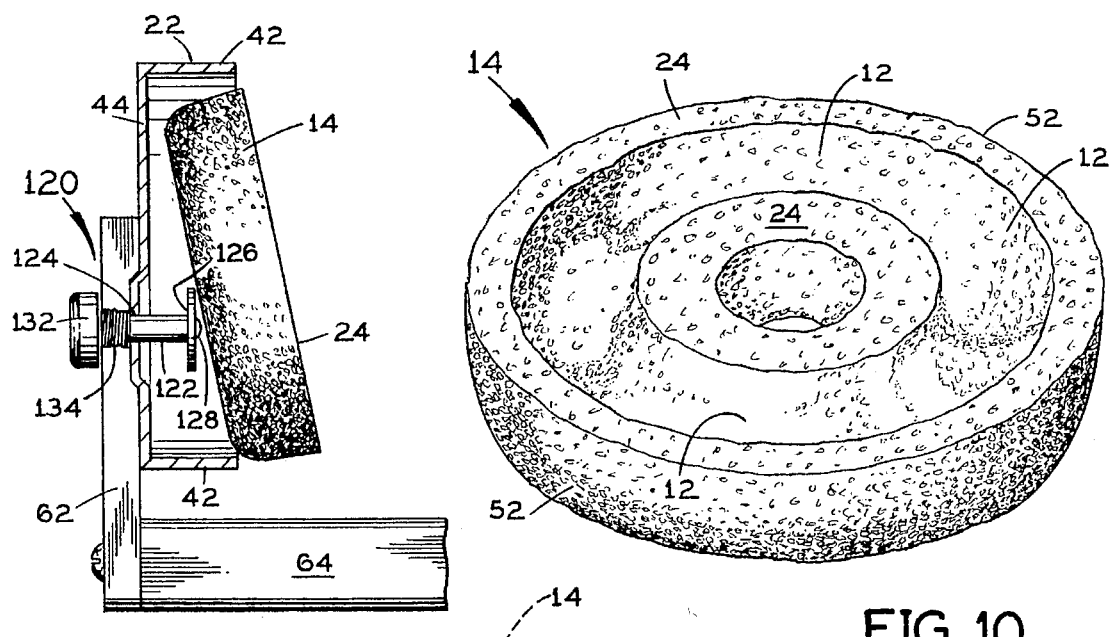
FIG. 9
FIG. 10

5,557,998

BAGEL CORING APPARATUS

BACKGROUND OF THE INVENTION

1. Field of the Invention

The present invention relates generally to the field of coring devices for removing matter from the interior of a food item. More specifically it relates to a bagel coring apparatus for cutting a circular channel in a cut bagel half which is substantially concentric with the bagel perimeter. Such a channel may be cut into two bagel halves, and cream cheese or any other desired bagel topping may be inserted into the channels and the bagel halves placed face to face together for consumption.

The bagel coring apparatus preferably includes a bagel retaining drum for receiving and holding a bagel half, with the bagel inner surface exposed. The drum is affixed to a mounting base and a coring element mounted at an end of an advancing drive screw approaches and enters the drum to core the bagel.

2. Description of the Prior Art

There have long been coring devices for removing matter from the interior portions of various food items. Several of these devices have been suited to removing a cylinder of matter from the center of an item, such as from an apple or a prune, but incapable of removing an annular core from a ring-shaped food item such as a bagel. Other devices which have been designed for annular coring of bagels have generally been awkward to use and expensive to manufacture.

Sonkin, U.S. Pat. No. 4,979,419, issued on Dec. 25, 1990, discloses an apparatus and method for treating baked goods. Sonkin includes a guide ring which is fitted against the cut face of a bagel half and is sized to follow the bagel outer periphery. Pin elements project from the abutting side of the guide ring to pierce the bagel half and hold the guide ring in position. A disk having a pair of blades projecting from a disk first face is pressed against the cut face of the bagel half so that the blades penetrate the bagel half just inside the guide ring. A flange on a second face of the disk is gripped by the user and rotated so that the blades scoop out bagel matter adjacent the inner edge of the guide ring. Alternatively to the guide ring, a guide screw formed of a twisted flat strip extends from a plate, and fits into a slot in the center of the disk. A problem with Sonkin is that the user must grip the bagel with one hand while cutting, and could accidently cut that hand. Another problem is that rotating the disk with one hand while holding the other hand against rotation is awkward. Finally, the screw alternative would not prevent the disk from wobbling during disk advancement, and the blades might skip out of the ring.

Valenti, U.S. Pat. No. 5,033,193, issued on Jul. 23, 1991, reveals a bagel scooper. Valenti includes a bagel holder having a tubular wall sized to receive a bagel half and an end wall with bagel engaging teeth. A bagel half is pressed against the teeth to secure it against rotation relative to the holder. Then a cutting element in the form of a disk member mounted at an end of a shaft is inserted into the holder. A blade projects from the disk opposite the shaft and is located radially with respect to the center of the disk to engage the bagel half between its outer and inner circumferences. The disk is rotated by turning a handle attached to the shaft and the blade cuts an annular channel into the bagel. A problem with Valenti is that the user must rely on their discretion as to how much pressure to apply to the handle to cut a core of an appropriate depth. Another problem with Valenti is that the user must once again grip the holder with one hand and hold it stationary while awkwardly rotating the handle with the other hand.

Chambos, U.S. Pat. No. 3,952,621, issued on Apr. 27, 1976, teaches a potato cutting machine. A potato is pressed against teeth protruding from a mounting disk, and the disk is affixed to a bit shaft which is fitted into a chuck of an electric drill. The drill is in turn mounted on a carriage which slides along a track in a mounting base. At an end of the track is a cutting surface including a plate perpendicular to the track and to the mounting base. Scoring knives and a slicing blade protrude from the plate toward the mounting disk and potato. The user activates the drill motor and slides the drill and carriage toward the cutting surface, and then presses the rotating potato against the plate and blade. The potato is cut into multiple helical strips which are discharged to one side of the cutting surface. A problem with Chambus is that the spinning potato or other item could fly off the spinning disk. Another problem is that the user, once again, must exercise imperfect discretion in deciding how much pressure to apply to the food item. Finally, the helical cutting configuration is not suited to coring bagels.

Farha, et al., U.S. Pat. No. 3,937,850, issued on Feb. 10, 1976, discloses a method of hollowing out an article of food. A food article is seated in a curved holding member. A blade element mounted at an end of a motor driven, rotating shaft is directed toward the food article. The holding member and the food article are advanced toward and against the blade element. The blade element may include multiple metal straps sharpened along elongate edges and bowing outwardly from the axis of rotation. The rotating blade element penetrates the food article. The holding member is moved translationally and rotationally as needed to permit the blade element hollow out the food article. A problem with Farha et al. if used for coring bagels is that moving the bagel half relative to the blade element to cut a circular channel would be awkward and haphazard. Another problem with Farha et al. is that the blade cutting edges are not oriented to efficiently cut into a bagel.

Thompson, U.S. Pat. No. 4,441,410, issued on Apr. 10, 1984, reveals a coconut grater. Thompson is much like Farha et al. in that a cutting element is mounted at an end of a rotating shaft and the food article is pressed and maneuvered against the cutting element. The only notable differences are that the Thompson cutting element is a convex surface with ragged edged openings punched through it and the shaft is rotated by a hand crank. The problems of Farha et al. are again presented.

Mason, U.S. Pat. No. 3,504,720, issued on Apr. 7, 1970, teaches a machine for dishing pineapples and similar food items. A U-shaped strap having a sharp longitudinal edge protrudes laterally from a shaft. The shaft is rotatably secured across a pineapple-receiving cavity. A pineapple is cut in half and one of the halves is placed in the cavity with the cut face directed outwardly. The shaft is positioned over the cut face and rotated with a crank handle to advance the cutting strap through the pineapple to cut out a curved chunk. A problem with Mason is that cutting by guiding a blade in a dipping movement into and out of the food article is not an efficient way to cut an annular channel.

It is thus an object of the present invention to provide a bagel coring apparatus which can remove an annular core of bagel matter from a bagel half which is concentric with the bagel perimeter to receive bagel toppings such as cream cheese.

It is another object of the present invention to provide such an apparatus which is self-supporting and which securely holds the bagel half against rotation during coring, and then permits rapid and reliable expulsion of the cored bagel half from the apparatus.

It is still another object of the present invention to provide such an apparatus which is readily portable, compact, and easy to use and clean.

It is finally an object of the present invention to provide such an apparatus which is simple, durable and inexpensive to manufacture.

SUMMARY OF THE INVENTION

The present invention accomplishes the above-stated objectives, as well as others, as may be determined by a fair reading and interpretation of the entire specification.

A coring apparatus is provided for coring a substantially annular food item, including a base member, a post member extending from the base member, the post member including a drive shaft guide structure, a drive shaft having a longitudinal axis and being rotatably fitted through the guide structure, the drive shaft having shaft external threads, a mechanism for engaging the shaft external threads, so that rotating the drive shaft relative to the post member causes the drive shaft to advance along the longitudinal axis relative to the post member, a food item cutting element mounted on the drive shaft including a blade having a blade cutting edge radially spaced from the drive shaft longitudinal axis for cutting along a circular path, and a food item holding structure connected to the mounting base and located within the longitudinal axis of the drive shaft and adjacent to the cutting element for securing the food item against rotation relative to the post member so that the cutting element is advanced toward the holding structure and into contact with the food item by rotating the drive shaft in one direction. The holding structure preferably includes a drum member having a tubular side wall sized to receive the food item and an end wall. The drum member preferably includes a food item engaging tab projecting inwardly from the tubular side wall. The apparatus optionally also includes a plunger mechanism for disengaging the food item from the drum member. The plunger mechanism preferably includes an elongate member passing through an opening in the end wall and having an abutment head for bearing against a food item. The plunger mechanism may additionally include a spring for biasing the elongate member to a position where the abutment head is retracted toward the end wall. The mechanism for engaging the shaft external threads preferably includes a plate member pivotally mounted to the post member on a fulcrum element which has a thread engaging plate edge, and also includes plate biasing spring adapted to bias the thread engaging plate edge against the drive shaft external threads.

BRIEF DESCRIPTION OF THE DRAWINGS

Various other objects, advantages, and features of the invention will become apparent to those skilled in the art from the following discussion taken in conjunction with the following drawings, in which:

FIG. 8 is a side view of the apparatus with the drum shown in cross-section, revealing a bagel half mounted within the drum and being engaged and cut by the coring blades.

FIG. 9 is a partial side view of the apparatus with the drum shown in cross-section and the plunger assembly button depressed so that the plunger flange is advancing against and expelling the bagel half.

FIG. 10 is a perspective view of a bagel half following coring, showing the resulting annular channel.

DETAILED DESCRIPTION OF THE PREFERRED EMBODIMENTS

Figure 1:
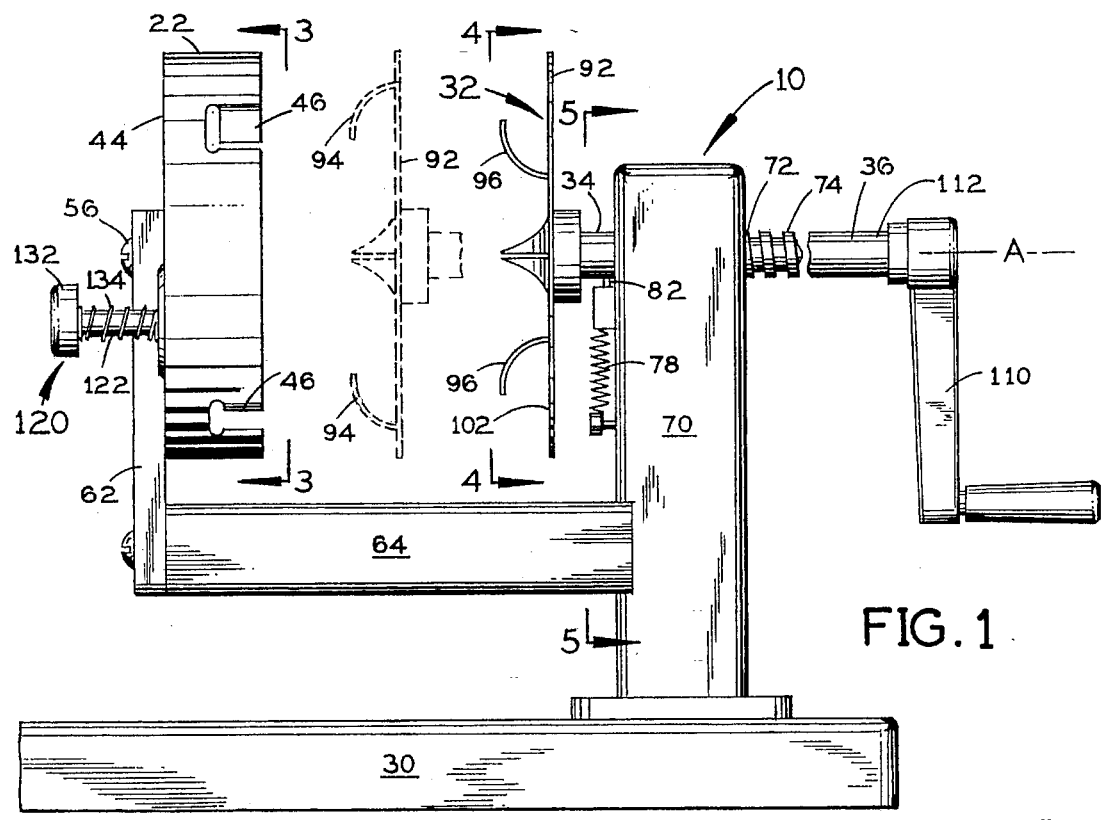
FIG. 1 is a side view of the inventive bagel coring apparatus, where the arcuate shape of the two outwardly directed cutting blades is revealed, and a second image of the disk in broken lines shows the two inwardly directed cutting blades.

As required, detailed embodiments of the present invention are disclosed herein; however, it is to be understood that the disclosed embodiments are merely exemplary of the invention which may be embodied in various forms. Therefore, specific structural and functional details disclosed herein are not go be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
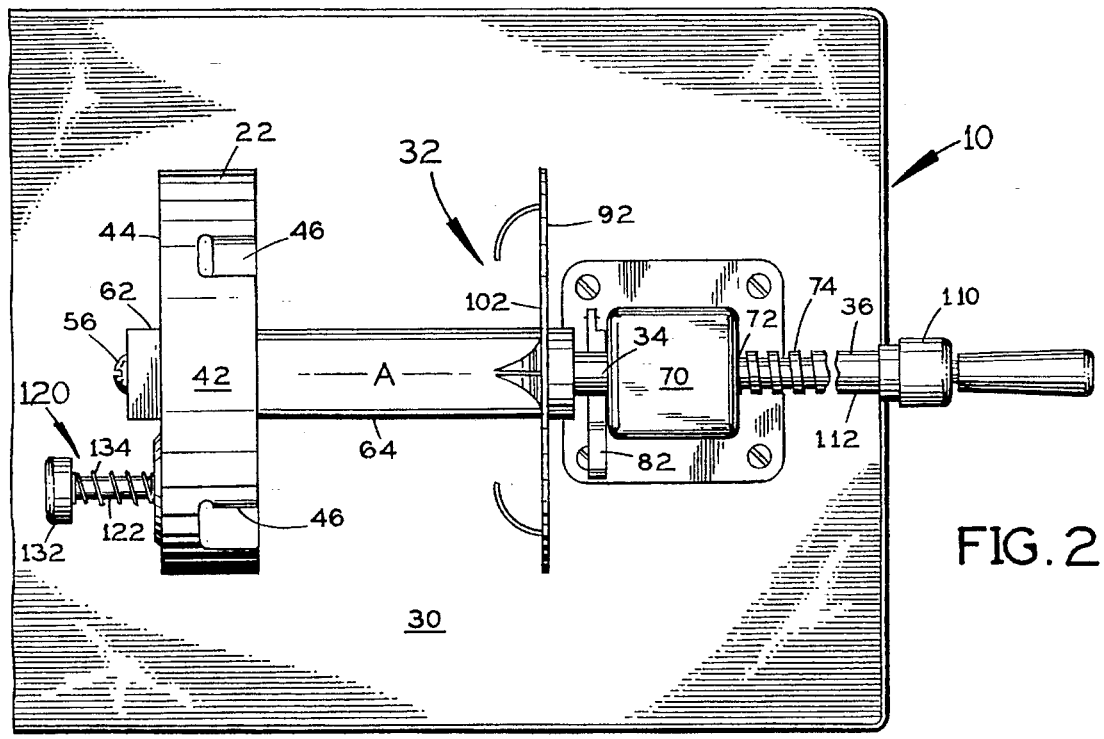
FIG. 2 is a top view of the apparatus.
Figure 3:
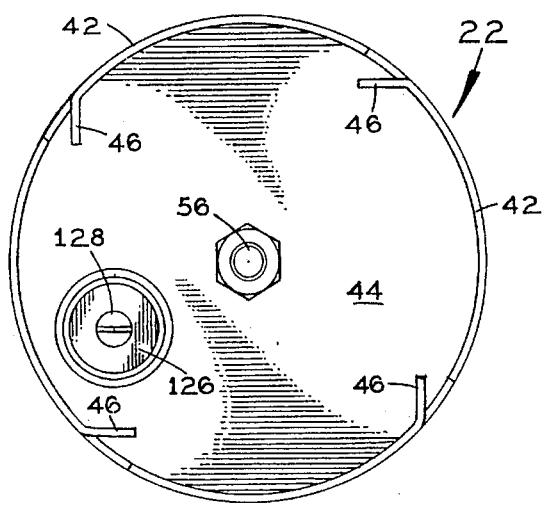
FIG. 3 is a plan view directly into the drum revealing the bagel securing tabs, the plunger flange and the drum mounting bolt.
Figure 4:
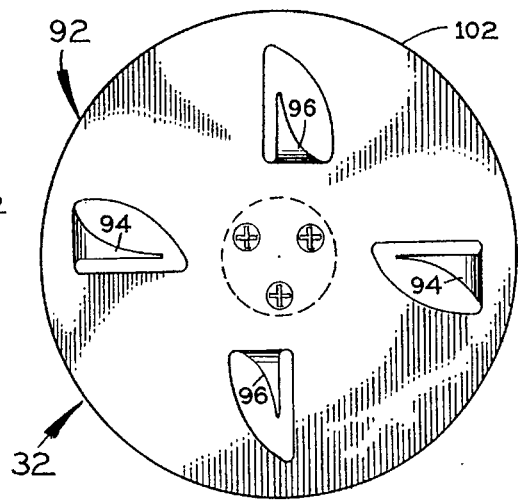
FIG. 4 is a plan view directly toward the cutting face of the disk, further revealing the shapes and orientations of the cutting blades.
Figure 5:
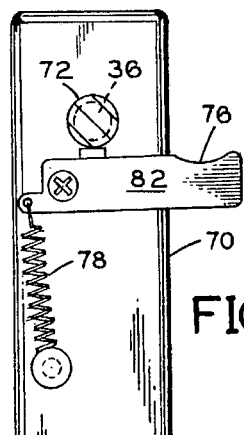
FIG. 5 is a plan view of the pivotally mounted drive screw engaging plate and the plate biasing spring, positioned out of engagement with the drive screw threads.
Figure 6:
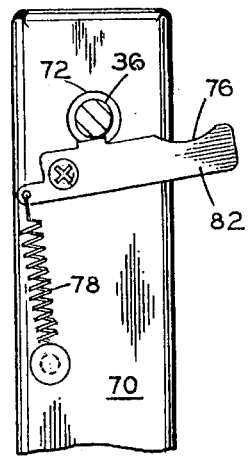
FIG. 6 is a plan view as in FIG. 5, with the plate engaging the drive screw threads.
Figure 7:
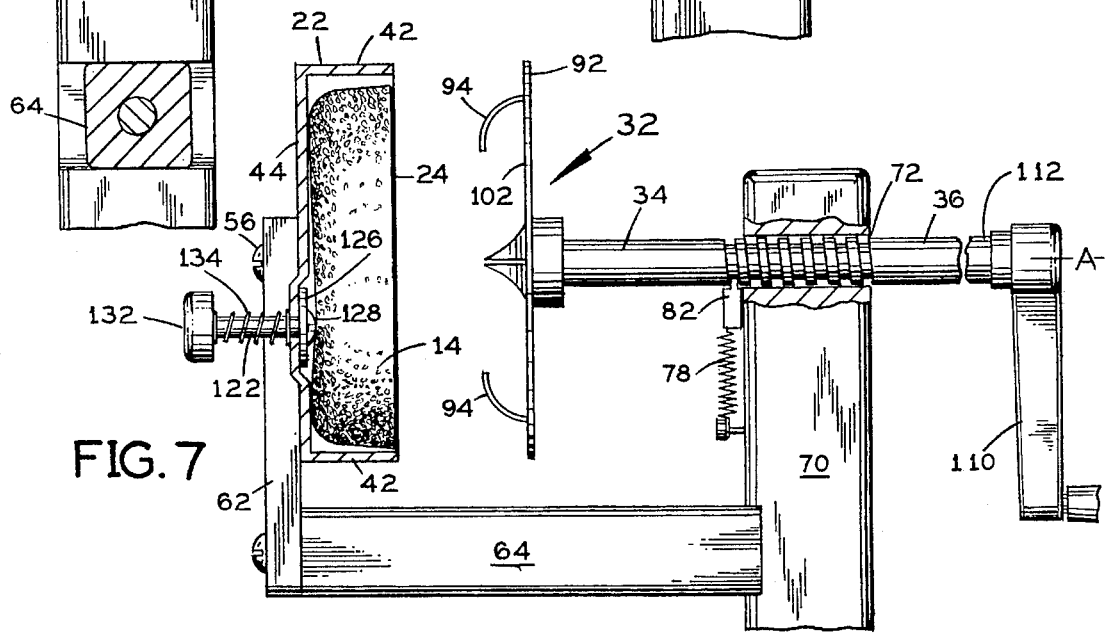
FIG. 7 is a partial cross-sectional side view of the apparatus, showing the drive screw bore, and exposing the parts constituting the plunger assembly.

Referring to FIGS. 1–10, a bagel coring apparatus 10 is disclosed for cutting a circular channel 12 in a bagel half 14 as shown in FIG. 10. Such a channel 12, which is substantially concentric with the bagel circular perimeter and is semicircular in cross-section, may be cut into two bagel halves 14. Cream cheese or tuna or chicken salad, or any other desired bagel topping is inserted into channels 12 and bagel halves 14 are placed face to face together for consumption.

Apparatus 10 preferably includes a bagel retaining drum 22 for receiving and securing a bagel half 14 with the bagel half 14 inner surface 24 exposed. Drum 22 is connected to a mounting base 30. A coring element 32 is mounted on a first end 34 of a shaft or drive screw 36 and approaches and enters drum 22 to core the secured bagel half 14.

Drum 22 preferably includes a circular side wall 42 and an end wall 44. Circular side wall 42 has inwardly bent, cut out tabs 46 for cutting into the outer perimeter surface 52 of the bagel half 14 to secure the bagel half 14 against rotation relative to drum 22. Tabs 46 are angled away from radial orientation to better anchor a bagel half 14 against rotation in the direction of coring element 32 cutting. Drum end wall 44 is preferably positioned vertically and has a fastener port (not shown) for receiving a drum mounting bolt 56. Bolt 56 secures drum 22 to a drum bracket 62 extending vertically upward from a horizontal arm member 64. Arm member 64 protrudes horizontally from a support post 70 extending vertically upward from mounting base 30. Drive screw 36 passes horizontally through a drive screw bore 72 in post 70, so that drive screw 36 is substantially axially aligned with the center of drum end wall 44. Threads 74 are provided on drive screw 36 to engage an edge 76 of a plate 82 biased with a spring 78 and mounted adjacent drive screw bore 72, so that rotating drive screw 36 causes drive screw first end 34 to advance toward or away from drum 22, depending on the direction of drive screw 36 rotation. See FIGS. 5 and 6.

Coring element 32 preferably includes a disk 92 extending radially from drive screw 36 rotational axis A. Four bagel cutting blades 94 and 96 protrude from a first face 102 of disk 92 toward drum 22. Two blades 94 arch toward the center of disk 92 to cut the curved outer wall of channel 12 and two blades 96 arch away from the center to cut the inner wall of channel 12. The curvatures of blades 94 and 96 cause blades 94 and 96 to each cut part of the bottom wall of channel 12. A hand crank 110 is provided on a second end 112 of drive screw 36. A bagel half removal plunger assembly 120 extends into drum 22 to push a bagel half 14 out of drum 22 after coring is completed.

Plunger assembly 120 preferably includes an elongate tube 122 extending through a plunger port 124 in drum end wall 44 having a broad plunger flange 126 extending radially therefrom within drum 22 and a rubber button 132 outside drum 22. See FIGS. 7 and 9. Plunger flange 126 is secured to tube 122 with a plunger screw 128. A coil spring 134 surrounding tube 122 bears against end wall 44 and button 132 to bias tube 122 so that flange 126 against drum end wall 44 until button 132 is depressed by a user. Pressing button 132 advances plunger flange 126 against the bagel half 14 within drum 22 and drives part of bagel half 14 out of drum 122.

While the invention has been described, disclosed, illustrated and shown in various terms or certain embodiments; or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim as our invention:

1. A coring apparatus for coring a single annular channel in a substantially annular food item, comprising:

a base member, a post member extending from said base member, said post member including drive shaft guide means, a drive shaft having a longitudinal axis and being rotatably fitted through said guide means, said drive shaft having shaft external threads, means for engaging said shaft external threads, such that rotating said drive shaft relative to said post member causes said drive shaft to advance along said longitudinal axis relative to said post member, a food item cutting element mounted on said drive shaft including a first blade means and a second blade means, the first blade means and the second blade means are radially spaced from said drive shaft longitudinal axis for cutting along a singular circular channel path, the first blade means has a pair of exterior arched blades arcuately extending in a radial direction away from said longitudinal axis for cutting an interior wall of a single annular channel, the second blade means has a pair of interior arched blades arcuately extending in a radial direction towards said longitudinal axis for cutting an exterior wall of the single annular channel, each of the exterior arched blades and each of the interior arched blades are angularly spaced from each other in alternating order about the longitudinal axis;

an annular food item holding means connected to said base member and located along said longitudinal axis of said drive shaft and adjacent said cutting element for securing a substantially annular food item against rotation relative to said post member such that said cutting element is advanced toward said holding means and into contact with said food item by rotating said drive shaft in one direction, and wherein the first blade means and the second blue means cut a single annular core in the annular food item, the single annular core being concentric to the perimeter of the annular food item.

2. An apparatus according to claim 1, wherein said annular holding means comprises a drum member having a tubular side wall and an end wall sized to receive said food item.

3. An apparatus according to claim 2, wherein said drum member comprises a food item engaging tab projecting inwardly from said tubular side wall.

4. An apparatus according to claim 2, additionally comprising plunger means attached to the holding means, for disengaging said food item from said drum member.

5. An apparatus according to claim 4, wherein said plunger means comprises an elongate member passing through an opening in said end wall, the elongate member having an abutment head for bearing against said food item.

6. An apparatus according to claim 5, wherein said plunger means additionally comprises spring means wrapped about the elongate member outside the end wall, the spring means adapted to bias said elongate member to an extended position from the outside of the end wall, wherein said abutment head is retracted inward toward an inside of said end wall.

7. An apparatus according to claim 1, wherein said means for engaging said shaft external threads comprises a plate member pivotally mounted to said post member on a fulcrum element and having a thread engaging plate edge, and comprises plate biasing means adapted to bias said thread engaging plate edge against said drive shaft external threads.

8. An apparatus according to claim 1, wherein the annular food item includes: a bagel half.

9. A coring apparatus for coring a single annular channel in a substantially annular bagel half section, comprising:

a base member, a post member extending from said base member, said post member including drive shaft guide means, a drive shaft having a longitudinal axis and being rotatably fitted through said guide means, said drive shaft having shaft external threads, means for engaging said shaft external threads, such that rotating said drive shaft relative to said post member causes said drive shaft to advance along said longitudinal axis relative to said post member, a food item cutting element mounted on said drive shaft, the cutting element including a pair of exterior arched blades arcuately extending in a radial direction away from said longitudinal axis and a pair of interior arched blades arcuately extending in a radial direction towards said longitudinal axis, said interior and exterior arched blades being radially spaced from said drive shaft longitudinal axis for cutting along a circular channel path, the pair of exterior arched blades for cutting an interior wall of a single annular channel, and the pair of the interior arched blades for cutting an exterior wall of the single annular channel, each of the exterior arched blades and each of the interior arched blades are angularly spaced from each other in alternating order about the longitudinal axis, an annular food item holding means connected to said base member and located along said longitudinal axis of said drive shaft and adjacent said cutting element for securing a single substantially annular bagel half against rotation relative to said post member such that said cutting element is advanced toward said holding means and into contact with said bagel half by rotating said drive shaft in one direction, and wherein both the first blade means and the second blade means simultaneously cut a single annular core in the bagel half, the single annular core being concentric to the perimeter of the bagel half.

10. An apparatus according to claim 9, wherein said annular holding means comprises a drum member having a tubular side wall and an end wall sized to receive said food item.

11. An apparatus according to claim 10, wherein said drum member comprises a food item engaging tab projecting inwardly from said tubular side wall.

12. An apparatus according to claim 10, additionally comprising plunger means attached to the holding means, for disengaging said food item from said drum member.

13. An apparatus according to claim 12, wherein said plunger means comprises an elongate member passing through an opening in said end wall, the elongate member having an abutment head for bearing against said food item.

14. An apparatus according to claim 13, wherein said plunger means additionally comprises spring means wrapped about the elongate member outside the end wall, the spring means adapted to bias said elongate member to an extended position from the outside of the end wall, wherein said abutment head is retracted inward toward an inside of said end wall.

* * * * *